UNITED STATES PATENT OFFICE.

LEON H. BARNETT, OF BELLOWS FALLS, VERMONT, ASSIGNOR TO MICAROID MANUFACTURING COMPANY, OF JERSEY CITY, NEW JERSEY, A CORPORATION OF NEW JERSEY.

MOLDING CASEIN AND PROCESS OF PRODUCING SAME.

No. 865,005.     Specification of Letters Patent.     Patented Sept. 3, 1907.

Application filed June 5, 1903. Serial No. 160,281.

*To all whom it may concern:*

Be it known that I, LEON H. BARNETT, a citizen of the United States, residing at Bellows Falls, in the county of Windham, State of Vermont, have invented certain new and useful Improvements in Molding Casein and Process of Producing the Same, of which the following is a specification.

My invention has for its object to provide a molding material which can be used as a substitute for hard rubber, celluloid, horn, bone, ivory, or the like, using as a base for my new material the now well known substance casein.

Attempts have heretofore been made to produce such a material from casein, but so far as I know they have all failed, because the material was either too brittle or would discolor and the process of manufacture was long, tedious and expensive. Not only does my material differ in composition from the materials heretofore produced, but the process of manufacturing it is also different, being chemical rather than mechanical.

My invention consists in combining with casein certain mineral substances, such as mica, talc, asbestos, or similar substances, and while this mixture may be said to be mechanical, it is made during the chemical treatment of casein, and, therefore, produces a much more homogeneous, uniform and intimate mixture than could be produced by purely mechanical means. Furthermore, the resultant material is much more easily molded and will not crack or discolor. I do not wish to be understood, however, as limiting myself to chemical method of combining these materials, as I consider that it is broadly new to produce a material composed of casein and these mineral substances, and while I consider a strictly mechanical mixture of these substances inferior, it is nevertheless within the scope of my invention.

I have discovered that if a solution of casein or of an alkaline caseinate be precipitated in the presence of certain mineral substances, such as asbestos, talc, mica, or similar substances, by a salt having an acid reaction, such as alum, lead nitrate, lead acetate, zinc chlorid, chrome alum, or similar salts, or mixture thereof, a material is produced insoluble in water, which, upon drying, can be readily molded and which, when molded, possesses great mechanical strength and toughness and high insulating value.

If it is desired to make the product impervious to moisture, as well as insoluble, I find that this can be accomplished by adding to the solution of casein or alkaline caseinate, an alkaline solution of wax, resin, shellac, or similar substances, and then proceeding as before described. I might also add that a cheaper product can be obtained by using acids, such as sulfuric, acetic or hydrochloric, instead of the acid salts above specified, although I prefer the latter.

In practice I have secured good results by dissolving commercial casein in about four parts by weight of water after adding sufficient alkali to make the solution alkaline. The percentage of alkali depends on the particular one used—thus about three (3%) per cent. of caustic soda is sufficient, while about fifteen (15%) per cent. of borax is used. I then heat this alkaline solution until the casein is dissolved, when I add the mineral substances in any quantity I desire. This solution is further diluted and heated and then agitated, the casein being then precipitated by the acid salts or acids hereinbefore referred to, carrying with it the other substances, complete precipitation being indicated by the liquid becoming clear. The clear liquid is then poured off and if desired the precipitated mass washed, after which the excess water is pressed out and the material dried, and if necessary reground to a powder when it is ready for molding.

To make the material waterproof, the process is the same as above, except that the resin, shellac, or similar substance is added to the solution before precipitating the casein and suspended matter; and for this purpose I have obtained good results by using a solution of resin and displacing therewith one half the quantity of casein.

The proportions of the various materials used may be varied greatly and I do not limit myself to those above set forth.

Having described my invention, what I claim is:

1. As a new article of manufacture waterproof molding casein composed of casein and resin precipitated from an alkaline solution in the presence of mineral substances, substantially as set forth.

2. The herein described process of manufacturing molding casein, which consists in precipitating from a solution of casein or of an alkaline caseinate by acids or salts of acid reaction casein in the presence of mineral substances, substantially as set forth.

3. The process of manufacturing waterproof molding casein, which consists in precipitating from a solution of casein or of an alkaline caseinate by acids or salts of acid reaction casein in the presence of mineral substances, and resin, substantially as set forth.

4. As a new article of manufacture, water-proof molding casein, composed of a caseinate of a metal, and resinate of a metal, precipitated from an alkaline solution in the presence of mineral substances, substantially as set forth.

5. As a new article of manufacture waterproof molding casein composed of casein and resinous material precipitated from solution in the presence of mineral substances substantially as set forth.

6. As new article of manufacture waterproof molding casein composed of caseinate of a metal and resinous material precipitated from solution in the presence of mineral substances, substantially as set forth.

In witness whereof, I have hereunto set my hand this first day of June, in the year nineteen hundred and three (1903), in the presence of two witnesses.

LEON H. BARNETT.

Witnesses:
 H. KIBBE BROOKS,
 W. J. ROIDER.